Figure 19:
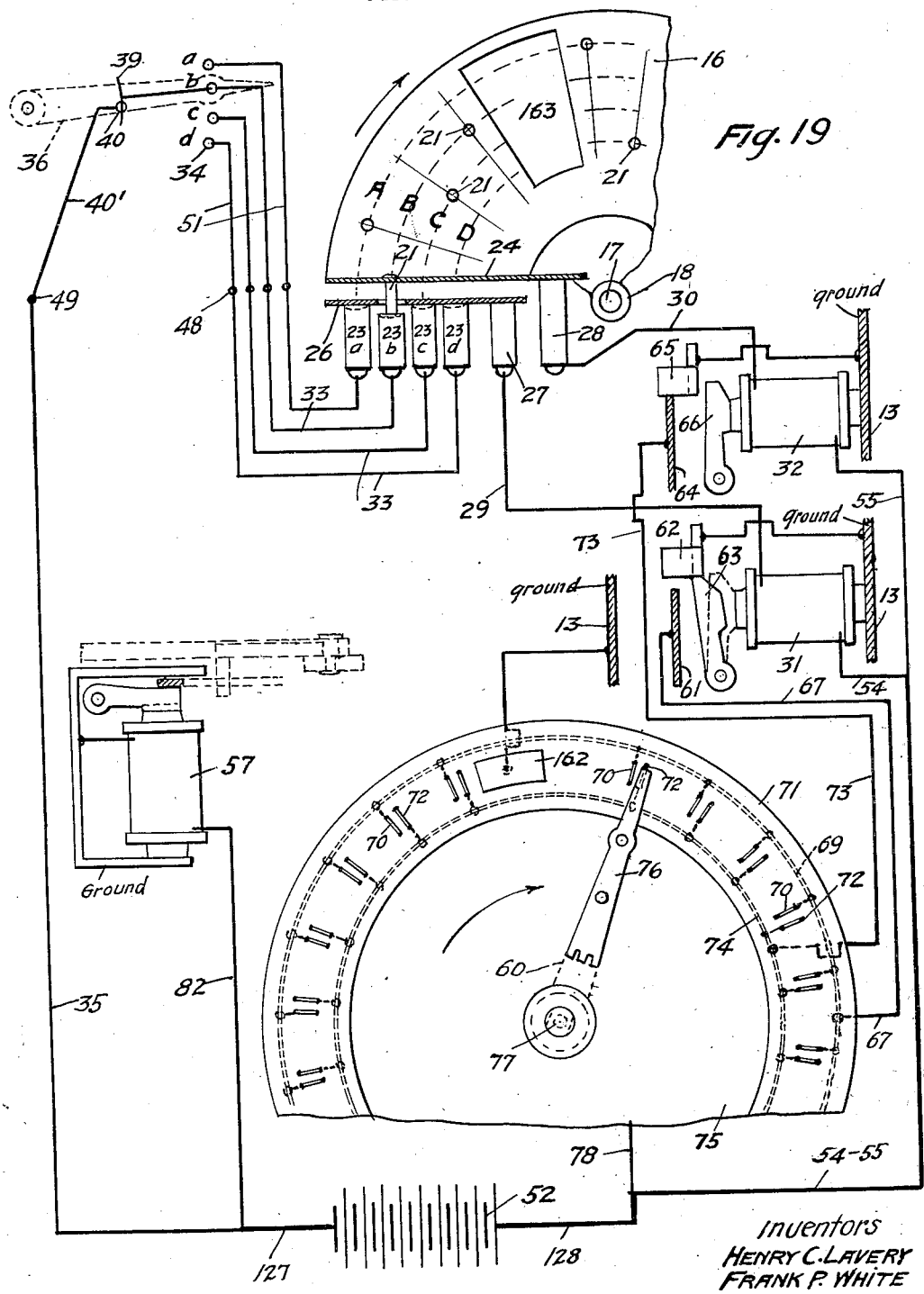

Oct. 10, 1933.  H. C. LAVERY ET AL  1,929,872
PSYCHOLOGICAL TEST MACHINE
Filed Nov. 5, 1931   12 Sheets-Sheet 1
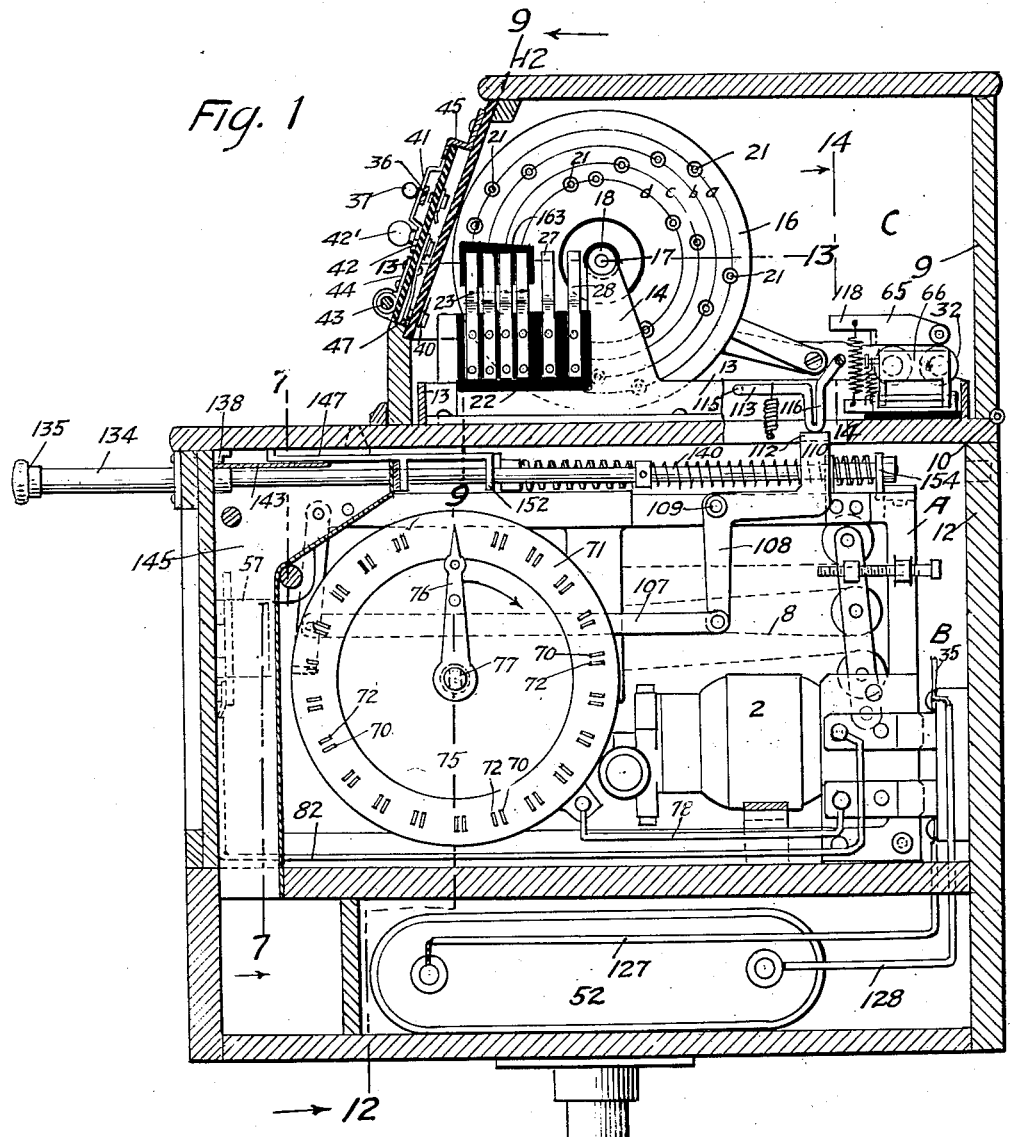
Inventors
HENRY C. LAVERY.
FRANK P. WHITE.
By Edwin Guthrie,
Their Attorney

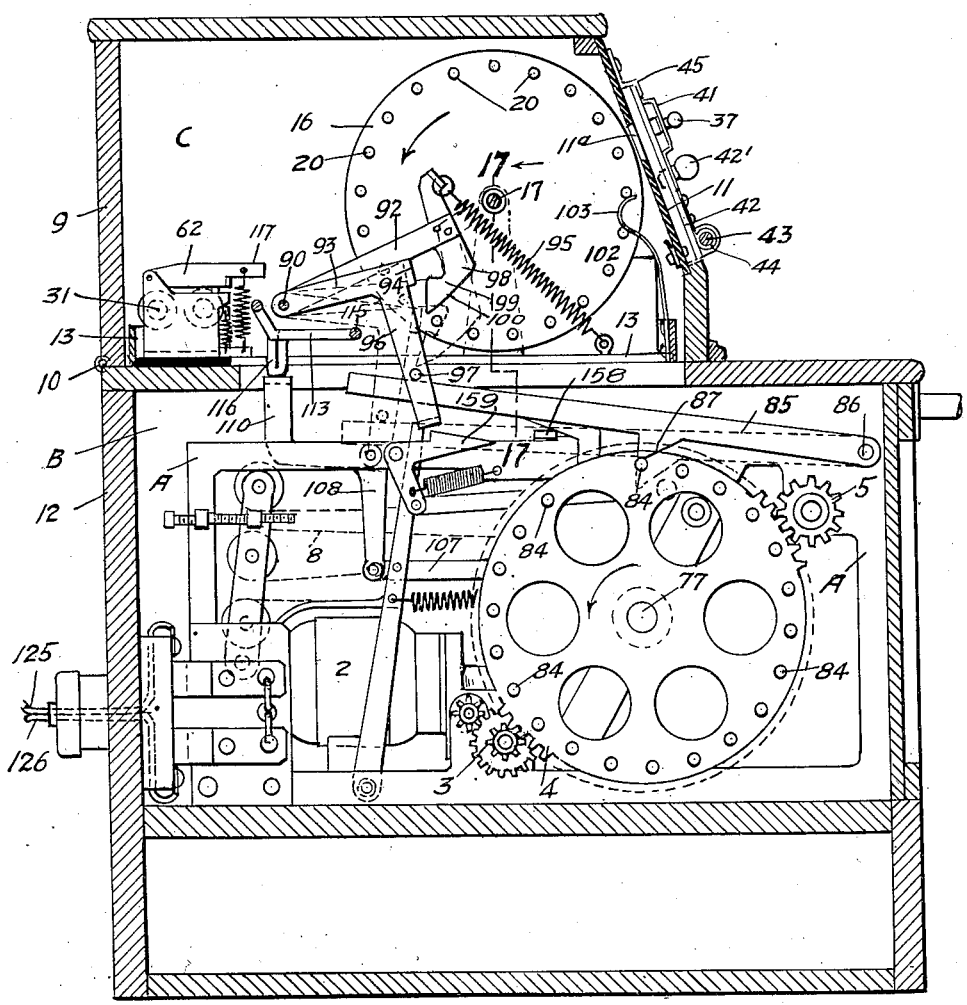

Oct. 10, 1933.    H. C. LAVERY ET AL    1,929,872
PSYCHOLOGICAL TEST MACHINE
Filed Nov. 5, 1931    12 Sheets-Sheet 3
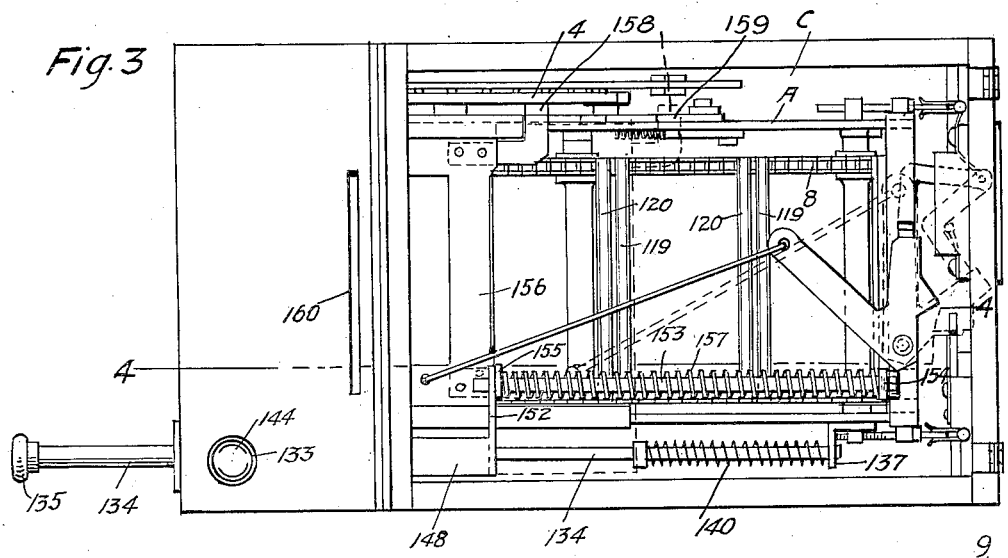
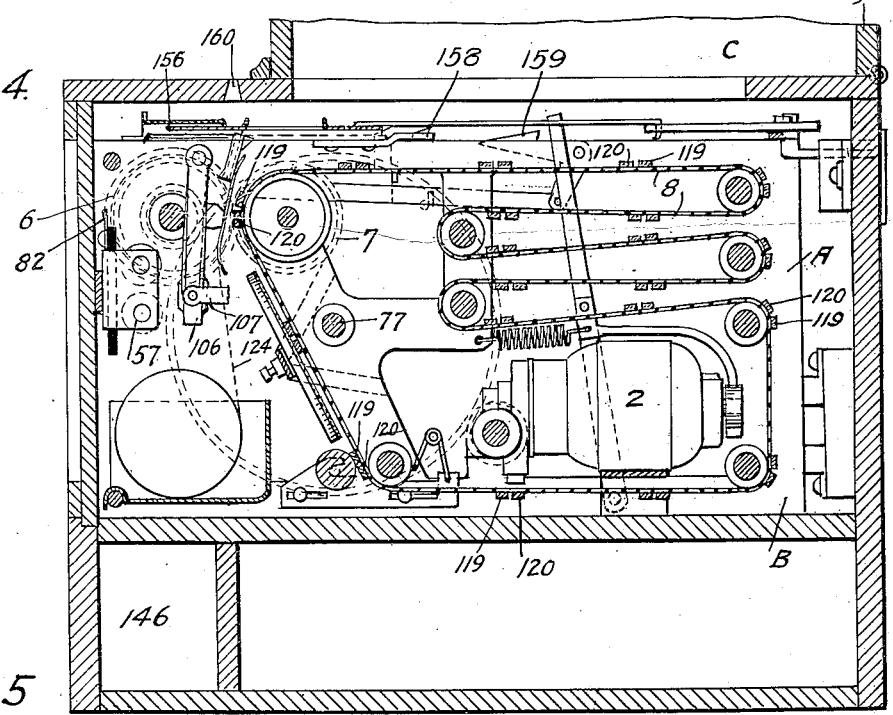
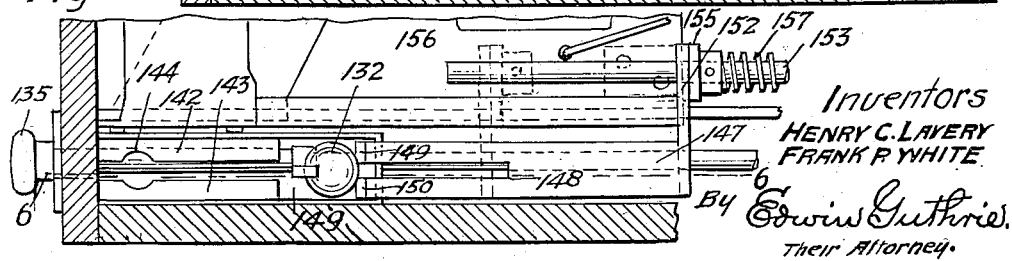
Inventors
HENRY C. LAVERY
FRANK P. WHITE
By Edwin Guthrie
Their Attorney.

Oct. 10, 1933.　　H. C. LAVERY ET AL　　1,929,872
PSYCHOLOGICAL TEST MACHINE
Filed Nov. 5, 1931　　12 Sheets-Sheet 4
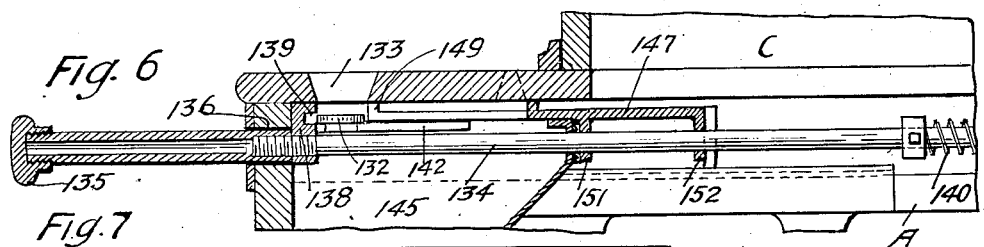
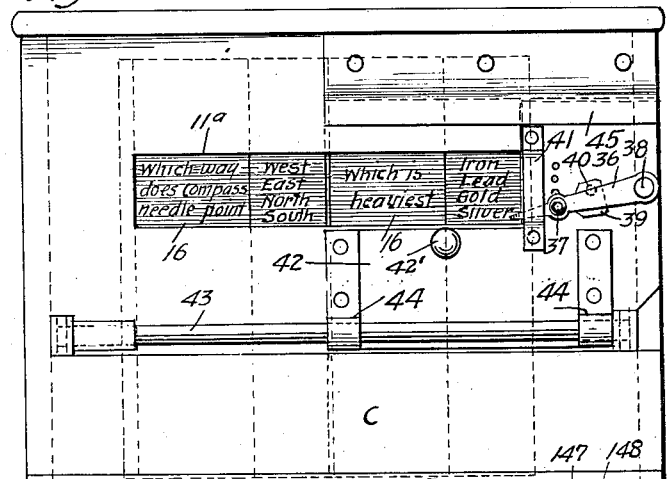
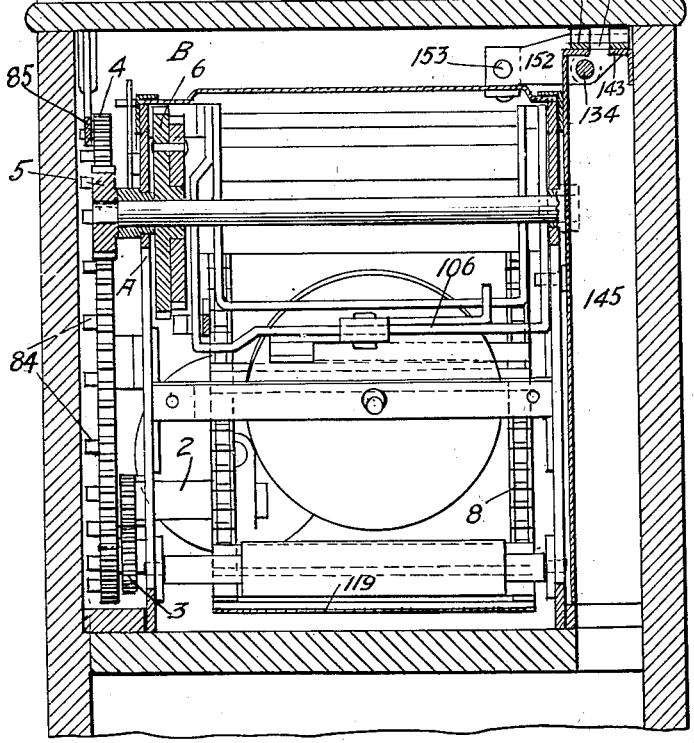
Inventors.
HENRY C. LAVERY
FRANK P. WHITE.
By Edwin Guthrie,
Their Attorney.

Oct. 10, 1933.    H. C. LAVERY ET AL    1,929,872
PSYCHOLOGICAL TEST MACHINE
Filed Nov. 5, 1931    12 Sheets-Sheet 5
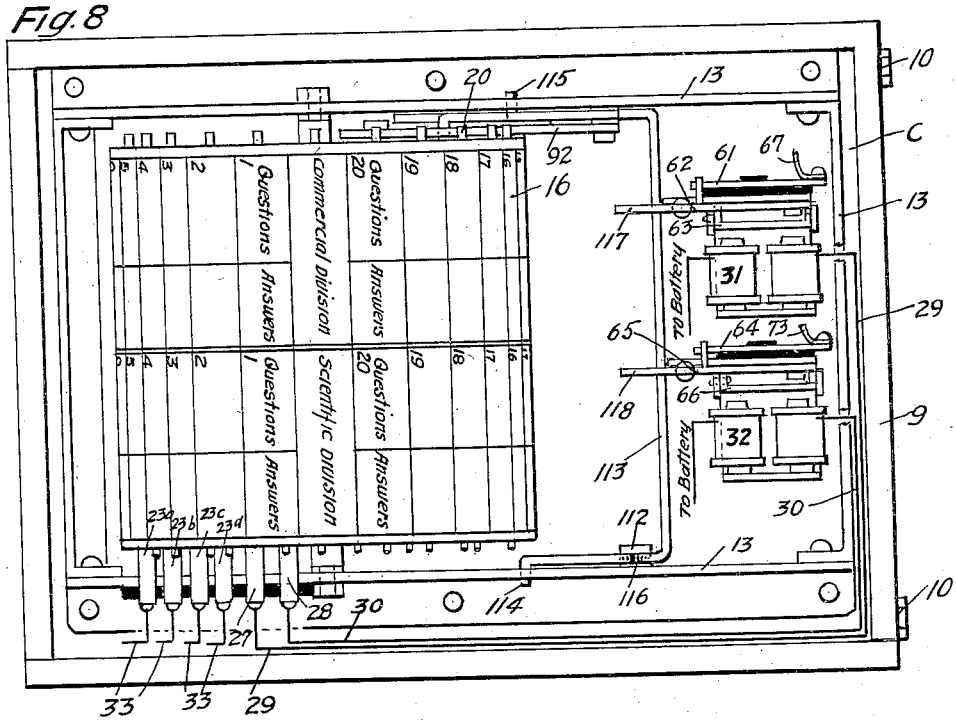
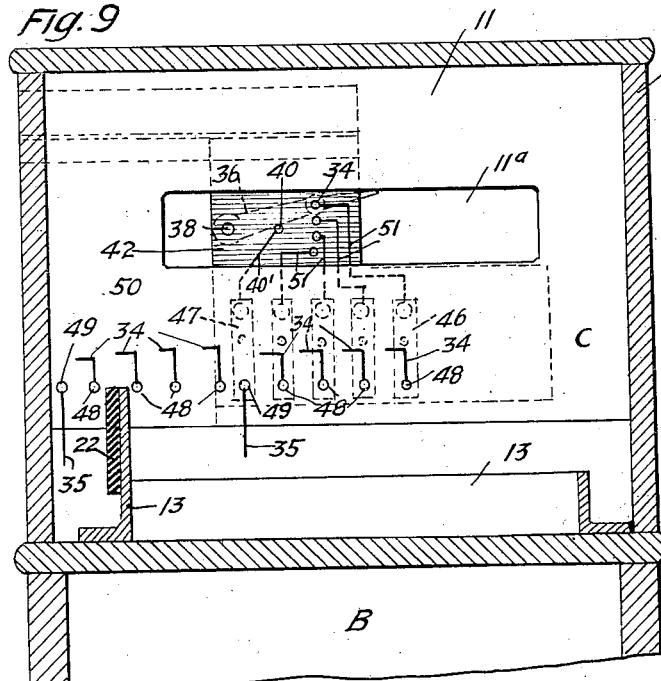
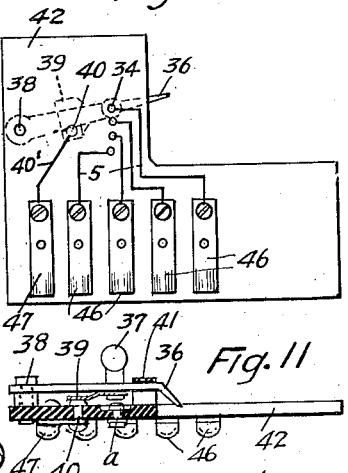
Inventors
HENRY C. LAVERY
FRANK P. WHITE
By Edwin Guthrie
Their Attorney

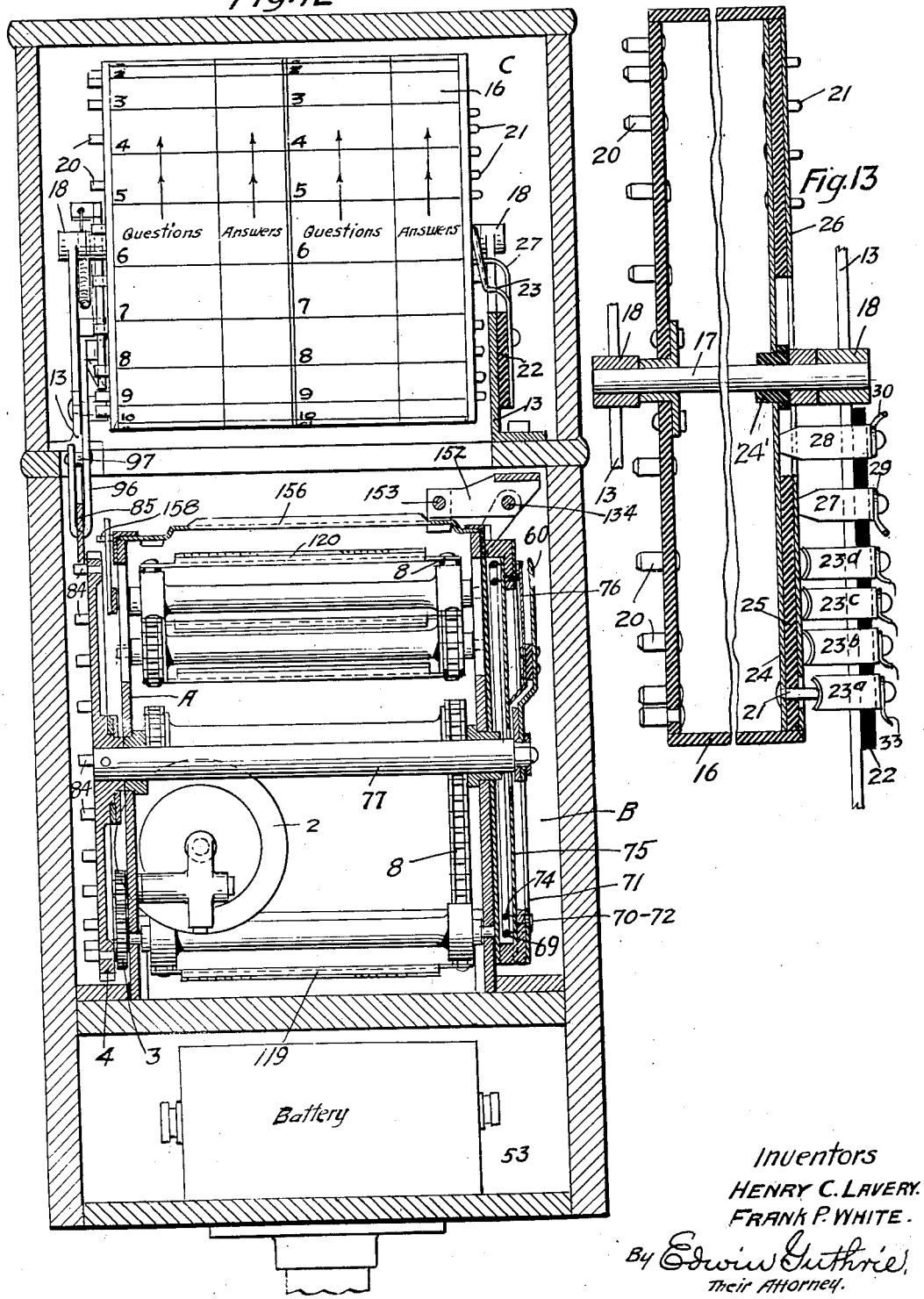

Oct. 10, 1933.  H. C. LAVERY ET AL  1,929,872
PSYCHOLOGICAL TEST MACHINE
Filed Nov. 5, 1931   12 Sheets-Sheet 7
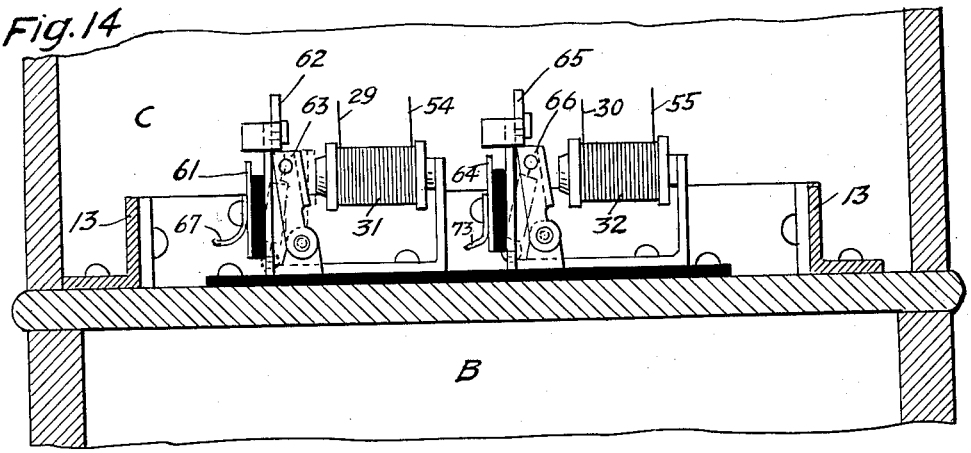
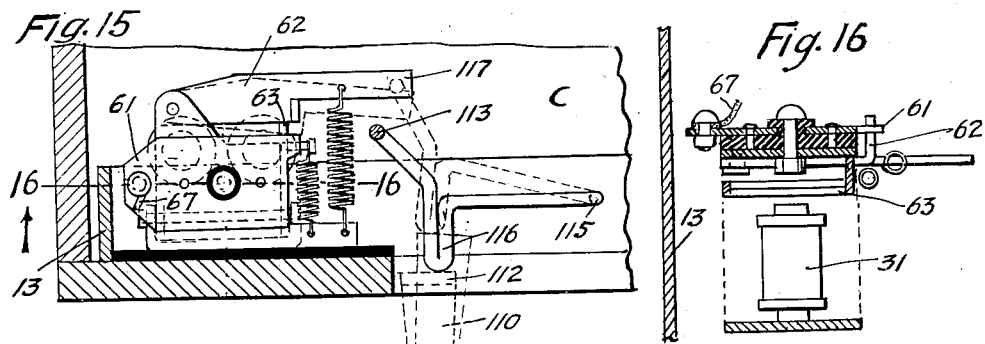
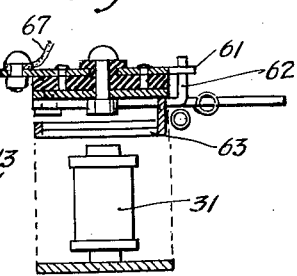
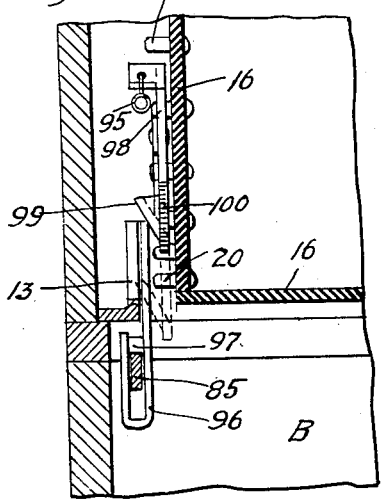
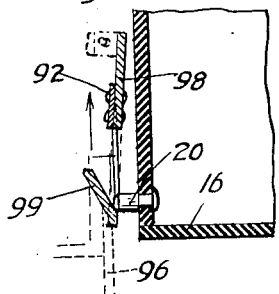
Inventors
HENRY C. LAVERY.
FRANK P. WHITE.
By Edwin Guthrie,
Their Attorney.

Oct. 10, 1933.   H. C. LAVERY ET AL   1,929,872
PSYCHOLOGICAL TEST MACHINE
Filed Nov. 5, 1931   12 Sheets-Sheet 9
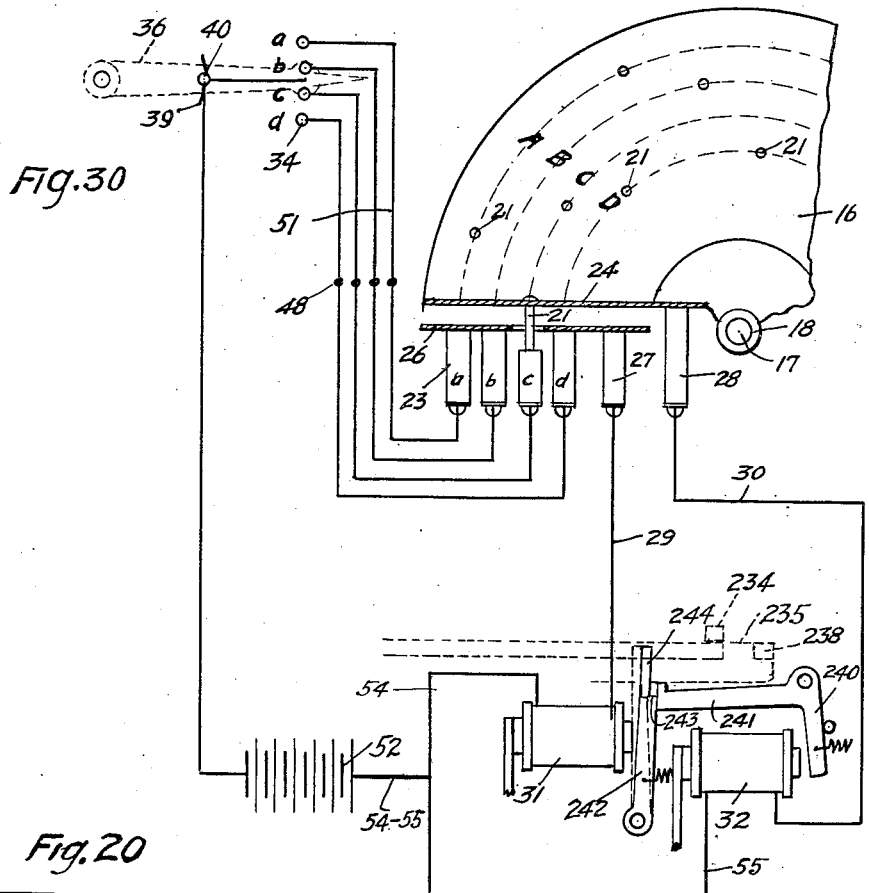
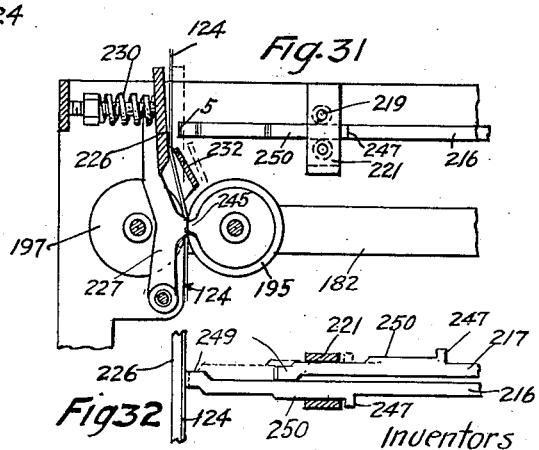
Inventors
HENRY C. LAVERY
FRANK P. WHITE
By Edwin Guthrie
Their Attorney Oct. 10, 1933.  H. C. LAVERY ET AL  1,929,872
PSYCHOLOGICAL TEST MACHINE
Filed Nov. 5, 1931  12 Sheets-Sheet 10
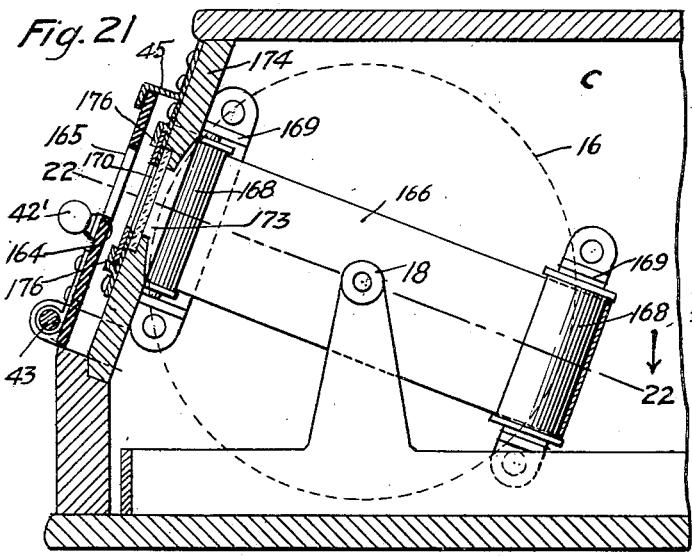
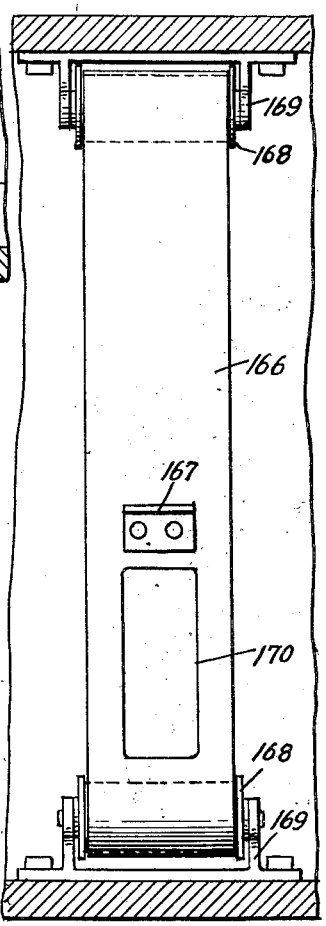
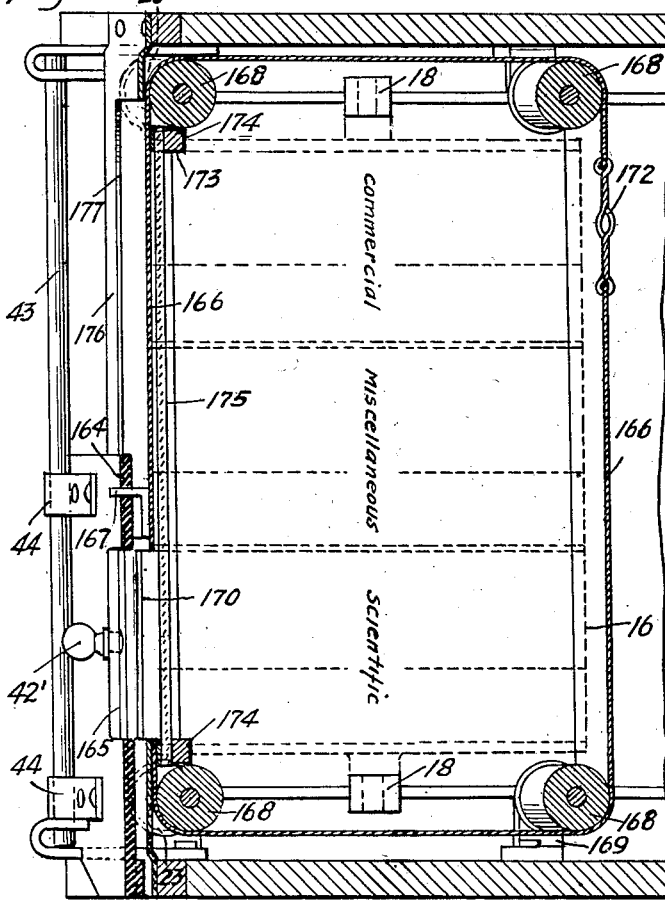
Inventors
HENRY C. LAVERY
FRANK P. WHITE
By Edwin Guthrie,
Their Attorney Oct. 10, 1933.  H. C. LAVERY ET AL  1,929,872
PSYCHOLOGICAL TEST MACHINE
Filed Nov. 5, 1931   12 Sheets-Sheet 11

Inventors
HENRY C. LAVERY
FRANK P. WHITE.
By Edwin Guthrie
Their Attorney.

Oct. 10, 1933.   H. C. LAVERY ET AL   1,929,872
PSYCHOLOGICAL TEST MACHINE
Filed Nov. 5, 1931   12 Sheets-Sheet 12
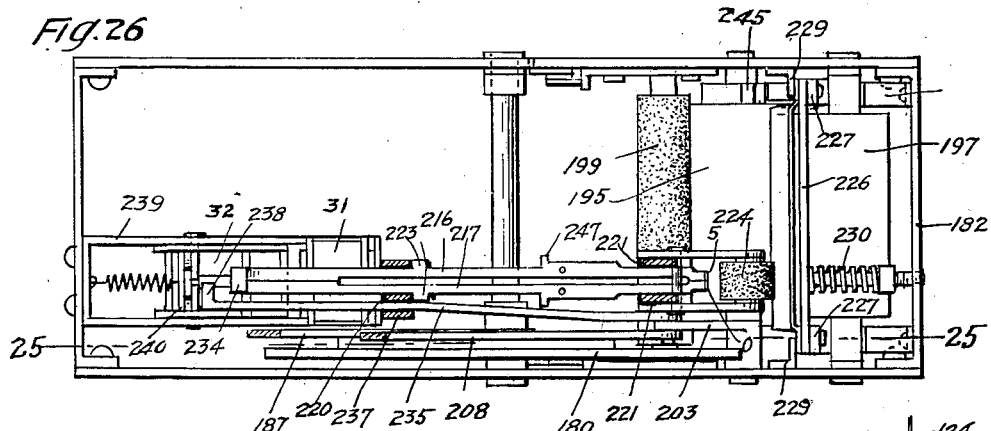
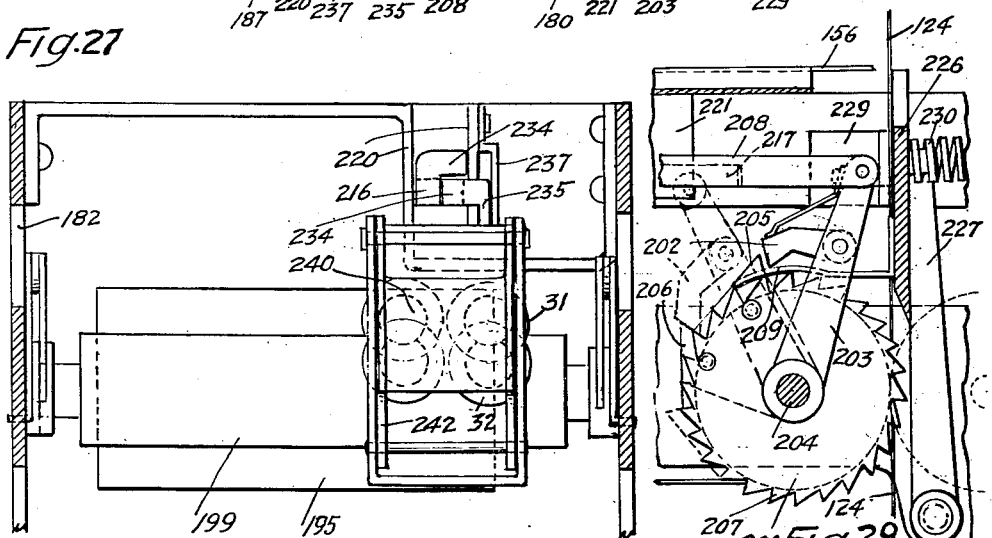
Inventors
HENRY C. LAVERY
FRANK P. WHITE
By Edwin Guthrie
Their Attorney Patented Oct. 10, 1933

1,929,872

UNITED STATES PATENT OFFICE 1,929,872

PSYCHOLOGICAL TEST MACHINE

Henry C. Lavery and Frank P. White, Minneapolis, Minn.

Application November 5, 1931. Serial No. 573,219

29 Claims. (Cl. 234—1.5)

This invention relates to a machine for scientifically testing and recording the intelligence and mental alertness of persons by the psychological method of giving answers to presented questions within specified limits of time.

In this kind of test as usually conducted in publicly printed form, there can be no positive check on the time limits imposed and for this reason such tests are unreliable as readings and psychological records of mental efficiency.

The main object of this invention is to provide a machine capable of automatically testing and recording the ability of a person to answer correctly each question presented by the machine in an accurately predetermined interval of time, and to automatically present a record from which a reliable psychological standard of percentage may be deducted.

Complementary objects are to provide means for classification and operation in the same machine of as many departments of tests as may be desirable, each one of which or all in succession may be selected for the psychological tests, and further to provide a coin controlled machine entirely automatic in operation. Other objects will appear from the following detailed specification with reference to the drawings.

The invention consists essentially in the constructions and combinations as illustrated in the drawings set forth in the specification and particularly pointed out in the claims.

The construction and operation of the recording compartment of the machine may be as disclosed in the application for Letters Patent of Henry C. Lavery, entitled Anatomical measuring and recording machine, filed April 16, 1931, Serial Number 530,664 which has been shown and described in the present application only in so far as it cooperates with the present invention, but we have also illustrated and described another and preferred recording device.

In the drawings Fig. 1 is a side elevation of a machine with the casing broken away and constructed according to our invention. Fig. 2 is a similar elevation of the opposite side of the machine. Fig. 3 is a plan view of the lower or recording section of the machine. Fig. 4 is a vertical section on the line 4—4 of Fig. 3. Fig. 5 is a horizontal view on a larger scale of the coin controlling parts in operative position. Fig. 6 is a section on the line 6—6 of Fig. 5 showing the parts in normal position. Fig. 7 is a front elevation of the testing compartment and a section on the line 7—7 of Fig. 1 of the recording compartment of the machine on a larger scale. Fig. 8 is a plan view of the testing compartment with the top of the casing removed. Fig. 9 is a section on the line 9—9 of Fig. 1 on an enlarged scale looking in the direction of the arrow and showing the test division selector positioned for a different class of tests from that shown in Fig. 7. Figs. 10 and 11 are details of the test division selector. Fig. 12 is a vertical section on an enlarged scale on the line 12—12 of Fig. 1. Fig. 13 is a horizontal section of the test cylinder or drum on a large scale on the line 13—13 of Fig. 1. Fig. 14 is an enlarged section on the line 14—14 of Fig. 1 illustrating the selective magnets. Fig. 15 is a side elevation of the selective magnets and connected operating parts. Fig. 16 is a detail section on the line 16—16 of Fig. 15. Fig. 17 is an enlarged detail section of the test drum and its operating parts on the line 17—17 of Fig. 2. Fig. 18 is a similar section illustrating the operation of the same parts. Fig. 19 is a diagrammatical view illustrating the electrical connections between the test selecting and test recording parts and the general operation of the machine. Fig. 20 is a sample section of a recorded psychological test automatically issuing from the machine.

Fig. 21 is a detail vertical section of the test compartment showing means for preventing public access to the test drum and view of the unselected test divisions. Fig. 22 is a horizontal section on the line 22—22 of Fig. 21. Fig. 23 is a front view of Fig. 22 partly in section.

Figure 24:
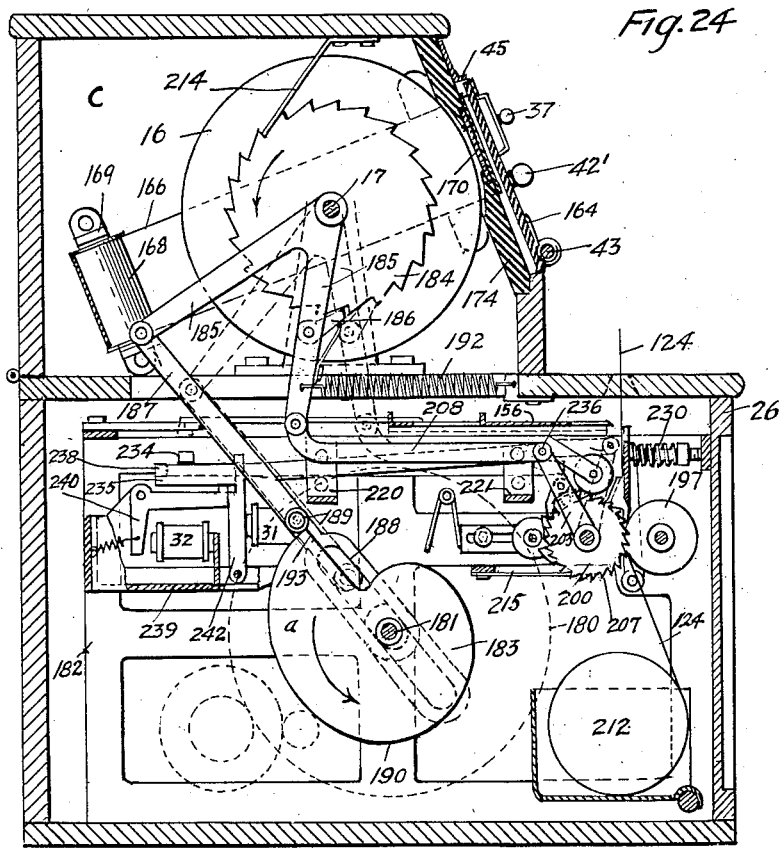
Figure 25:
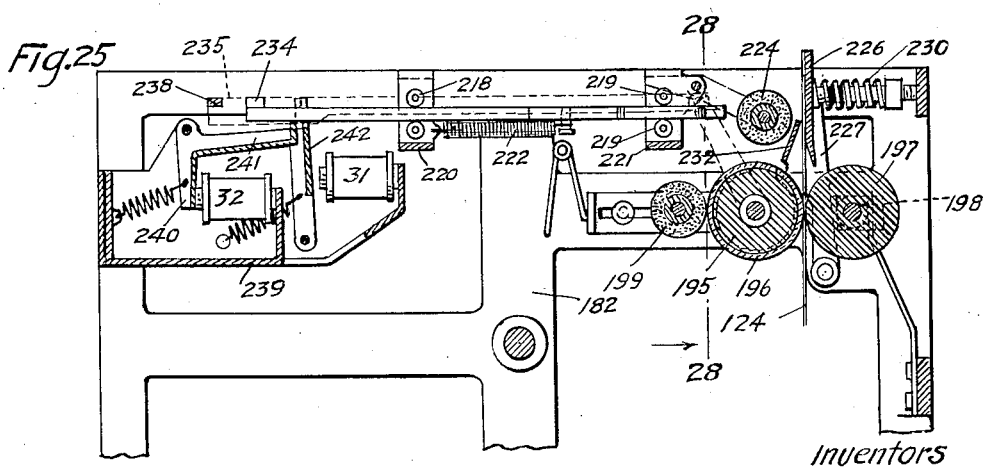

Fig. 24 is a side elevation of a machine with the outer casing broken away and having a modified and simpler constructed recording device than that shown in the preceding figures. Fig. 25 is a vertical section on a larger scale on the line 25—25 of Fig. 26. Fig. 26 is a plan view of the recording compartment of the machine as shown in Fig. 24. Fig. 27 is a vertical cross section of the parts illustrated in Fig. 26, taken near the right hand end of Fig. 26 and on a larger scale. Fig. 28 is a vertical section on the line 28—28 of Fig. 25 on a larger scale. Fig. 29 is a sectional view on the line 29—29 of Fig. 28. Fig. 30 is a diagrammatical view illustrating the electrical circuits. Figs. 31, 32 and 33 are details illustrating the aligning and printing of the test record.

Referring first to Figs. 1 to 4 inclusive, "A" represents the frame of a recording machine shown operated by an "electric" motor 2 through speed reducing gears 3, master gear 4, pinion 5, gears 6 and 7, and endless type carrier 8. A selecting and testing compartment C is placed directly above the recording compartment B as shown in Figs. 1 and 2. The casing 9 of the compartment C is preferably hinged at 10 to the casing 12 of the lower compartment and a suitable locking device (not shown) arranged to secure the two casings together. A frame 13 is secured to the top of the lower casing B and is provided with upward extending frame members 14. The test drum 16 is rotatably mounted upon a shaft 17 journalled in the bearings 18 of the frame members 14. The drum 16 is made of fiber or other insulating material and one end of the said drum is provided with a series of projecting operating pins 20 and the opposite end with projecting contact pins 21. The operating pins 20, preferably twenty one in number, are arranged in a circle near the circumference of the drum as shown in Fig. 2, while the contacting pins 21, of equal numbers, are spaced the same degrees apart and arranged in staggered, radial relationship in circles, each one having a different radius, as shown in Fig. 1.

Upon the frame 13, but insulated therefrom by a fiber insulating plate 22, (see Fig. 13) are secured four contact springs 23a, 23b, 23c, and 23d arranged radially with respect to the test drum 16, so that each one will contact the pins in their respective circular paths when the drum 16 is rotated. The pins 21 are secured to a brass current conducting disc 24 supported by the shaft 17 upon an insulated supporting member 24' and arranged upon the inner side of the insulating end plate 25 of the drum 16. Another current conducting plate 26 is secured to the outer face of the end plate 25 and is provided with enlarged holes through which the contact pins 21 passes without contact. A contact spring 27 is secured to the insulating plate 22 and is adapted to have constant contact with the outer conducting plate 26, while a spring 28 also secured to the insulating plate 22 is adapted to constantly contact the inner conducting disc 24. It is evident that if an electrical current is caused to pass through any one of the springs 23 in contact with the outer conducting plate 26, the current will be transmitted to the spring 27 and when any one of the springs 23 contacts a pin 21 this particular spring will be in electrical connection with the spring 28. A wire 29 electrically connects the spring 27 with a magnet 31 (Figs. 8, 14 and 19) and a wire 30 makes electrical connection between the spring 28 and magnet 32. The four contact springs 23 are electrically connected by wires 33 to a similar number of selecting contact terminals 34 which have been designated a, b, c, and d, corresponding to the pin circles A, B, C, and D of the test drum 16 as shown in Fig. 19. A selecting pointer 36, (Figs. 7, 10, and 11) having an operating finger knob 37 is loosely pivoted at 38 and is adapted to swing and make contact with either one of the contact pins a, b, c, and d by inward manual pressure. A spring 39 is secured to the pointer 36 and is tensioned against a permanent contact terminal to hold the pointer 36 away from the terminals a, b, c, and d and against a stop clip 41 as best shown in Fig. 11. The selecting pointer, contact point 4 and terminals a, b, c, and d are mounted upon an insulating plate 42 which, for the purpose hereinafter set forth, is slidably mounted upon a stationary crossrod 43, by means of clips 44 and guide plate 45.

As shown in Figs. 7 and 8 the test drum is provided with two classified divisions of questions and answers, but it will be understood that any desired number of divisions may be arranged for by a widening of the machine and also that any desired number of questions and answers may be provided for by a change in the diameter of the test drum. In order to establish the proper electrical connections in the several test divisions of the drum 16 the selector slide 42 is provided with a series of contact springs 46 corresponding in number and spacing to the contact pins a, b, c, and d and with a spring 47 electrically connected to the switch terminal 40. A series of selecting terminals 48 (see Fig. 9) with which the springs 46 are in contact and a permanent terminal 49 contacted by the spring 47 are arranged upon the insulating end plate 50 of the casing—for each test division. Each one of the contact springs 46 is connected by a wire 51 to a corresponding terminal 34 upon the selector plate 42 and the contact spring 47 to the switch terminal 40 by a wire 40'. The wires 33 from the selecting terminals 48 of each division are joined together but divisionally connected to the contact springs 23 and the wires 35 from the permanent terminals 49 are jointly connected to a storage battery 52, preferably located in a lower compartment 53 of the casing B. The battery 52 is in electrical wire connection 54 with the opposite pole of the magnet 31 from that of the wire 29 and with the opposite pole of the magnet 32 from that of the wire 30 by a wire 55 and with the permanent terminals 49 through the wires 35. An electrical circuit may thus be closed through the battery 52 by contacting the pointer spring 39 with any one of the terminals a, b, c, or d, through switch terminal 40, wire 40', permanent terminals 49, wires 35 and 54, magnet 31, contact spring 27, conducting plate 26, contact springs 23 and wires 33, selecting terminals 48, contact springs 46 and wires 51. Or if the one terminal of the terminals a, b, c, and d, is selected which is in electrical connection with a contact pin 21 of the test drum 15 the circuit will be closed as before through the battery 52, but from thence through the wire connection 55, through the magnet 32, wire 30, contact spring 28, conducting plate 24, contact springs 23 a, b, c, or d, a wire 33, terminal 48, spring 46 and wire 51 back to the selected terminal. These two circuits including either the magnet 31 or the magnet 32 may be termed the selecting circuits in contra-distinction to the recording circuit hereinafter described, including a magnet 57, which circuit is closed by the preceding closure of the selecting circuit.

As shown, with reference to Figs. 1 and 7, there is arranged upon the circumference of the test drum the same number of answers to a question as there are selecting contact springs 23 and circular rows of contact pins 21 on the end of the test drum. The answers are arranged on the circumference of the drum relative to the radial and circular position of the contact pins 21 and the radial and circumferential position of the contact springs 23 with respect to the drum 16, so that when the pointer 36 indicates the right answer and is depressed to close the electrical circuit, a pin 21 will come in contact with a contact spring 23 when the drum is rotated and close the circuit through the magnet 31. Correspondingly when the pointer is depressed pointing to any one of the three wrong answers, the pins 21 will be absent at the contacting point and the circuit will be closed through the magnet 32. The closing of the circuit through the magnet 31 indicates the right answer to a question, while the closing of the circuit through the magnet 32 denotes the wrong answer. In the machine disclosed the questions are numbered from 1 to 20 in each of the two divisions on the test drum 16, with one contact pin for each question in each division. The object of the radially staggered, irregular position of the pins shown is to prevent the correct answer from appearing in the same regular order and column for each question, which might be memorized by the operator.

After the selection of an answer when one of the two magnets 31 or 32 has been energized in the manner above described, by closing a selected circuit, the recording circuit is automatically grounded for closing by the record selector 60. The magnet 31 is provided with a contact plate 61 and a grounded spring tensioned circuit closer 62 is normally held out of contact with the plate 61 by the magnet armature 63, (see Figs. 14 and 15). The magnet 32 is identical in construction with the magnet 31 and has a similar contact plate 64, a grounded spring tensioned circuit closer 65 and a spring tensioned armature 66 normally holding open the circuit closer 65. Referring again to Fig. 19 the contact plate 61 for the circuit closer 62 of the magnet 31 is electrically connected by a wire 67 and multiple wire conductor 69 to a series of insulated contact strips 70 arranged in spaced annular formation upon a dial plate 71 secured to the machine A (Figs. 1 and 12). The contact plate 64 for the circuit closer 65 of the magnet 32 is connected by a wire 73 and multiple wire conductor 74 to a series of insulated contact strips 72, spaced adjacent the strips 70. An insulated electrical conducting disc 75 is secured to the dial plate 71, and is constantly contacted by a copper brush 76 secured to the record selector 60, but insulated therefrom. The selector 60 is fast to a shaft 77, mounted concentrically with the dial plate 71 in the frame of the recording machine A and carrying on the opposite side of the machine the master driving gear 4. The contact strips 70 and 72 are spaced in pairs equalling in number the number of contact pins 21 in the selecting compartment. The space between each pair of contact strips and the interval for traveling this space by the contact brush 76 provides the exact time limits within which each question presented by the machine must be answered by the operator. The recording circuit can only be closed when either one of the electrical wire connections 67 or 73 has been grounded by the energization of one of the magnets, 31 or 32. When thereafter the rotating brush 76 of the record selector 60 contacts the strip 70 or 72 corresponding to the magnet that has been energized, an electrical circuit is established from the battery 52 to the conducting disc 75 through a wire 78, thence to a strip 70 or 72 contacted by the selector 60 to the contact plate 61 or 64 which has been selectively grounded, and from the ground to the magnet 57 controlling the recording mechanism and through a wire 82 back to the battery 52.

In the operation of the machine, during the passage of the record selector 60 from one pair of contact strips to the next pair in rotation, the test drum 16 remains stationary the predetermined length of time, but is quickly moved forward a step at the expiration of the time limit by the following means. Referring to Figs. 2 and 12 the master driving gear 4 driven at a slow, predetermined speed in the direction of the arrow by the electric motor 2, through its internal speed reducing mechanism supplemented by the train of speed reducing gears 3, carries a series of projecting driving pins 84 near its periphery. The number of these pins corresponds to the number of operating pins 20 on the test drum 16 and is in the present instance twenty one. The number of questions provided for on the test drum 16 is shown as twenty for each division, and a space X is reserved for display of an explanatory heading on the test drum and on the printed record. A horizontally arranged actuating lever 85 is pivoted on the machine A at 86 and is provided with a bevelled tooth or cam 87 normally resting in an elevated position on the first pin 84 when the machine is at rest. Upon the frame 13 of the selecting compartment C at 90, are pivotally mounted an escapement lever 92 and a crank lever 93. The lever 92 is supported on a projecting lug 94 of the crank lever 93 against the tension of a spring 95 attached to the upper end of the escapement lever 92 and to the frame 13. The depending arm 96 of the crank lever 93 is preferably U-formed as particularly shown in Figs. 12 and 17 and a pin 97 connects the two legs of the U. The actuating arm 85 passing under the pin 97, supports both the crank lever 93 and escapement lever 92 against the tension of the spring 95. The escapement lever 92 is preferably formed of a flat spring to the extreme outer end of which is secured the driving escapement member 98 best illustrated in Figs. 17 and 18. The lower part of the member 98 is provided with a vertically inclined and inwardly projecting escape lug 99 and an upwardly inclined driving face 100. In the raised position as shown in full lines Fig. 2 the escapement member 98 is disengaged from the operating pins 20. When however by the first movement of the driving gear 4, the cam 87 of the actuating lever 85 instantly drops off from the supporting pin 84, the escapement member 98 simultaneously drops to the dotted line position in Fig. 2 impelled by the spring 95 and its lower driving face 100 quickly turns the test drum the distance between the centers of two operating pins 20. A detent spring 102 having a semi-circular curve 103 fitting between two pins 20 accurately retains the drum 16 in the new position. As the master gear 4 slowly revolves the second driving pin 84 slowly raises the arm 85 and with it the crank lever 93 and escapement lever 92. The inclined escapement lug 99, passing over the end of the pin 84, will slightly twist the spring lever 91 as indicated in Fig. 18 until having passed the pin the escapement lever 98 springs back to the original driving position. With the continuing rotation of the gear 4 this operation is repeated and the test drum 16 is rotated in a step by step movement until the last pin 84 has passed under the cam 87. Since all the pins 84 are spaced the same number of degrees apart except the first and the last in the order of rotation the intervals for selecting the answer to each question will be exactly the same. As there are shown only twenty questions on the test drum, the passage of the twentieth pin completes the test and the operation of the cam 87 by the last or twenty first pin brings the display section of the test drum in view and the longer space between this pin and the first pin provides a longer interval for printing the instructions on the test record before the machine comes to a stop with the cam 87 again resting on the first pin.

Referring again to Figs. 1 to 4 inclusive, the swinging printing yoke 106 is connected by a link 107 to a bellcrank 108, pivotally mounted at 109 to the machine A and having an upward extending tail piece 110, provided with a lateral operating lug 112. A horizontally arranged spring tensioned yoke 113 (see also Fig. 8) is pivotally supported on the upper compartment frame 13 at 114 and 115 and is provided with a depending foot 116 resting on the operating lug 112. The lateral section of the yoke 113 is positioned under the projecting end 117 and 118 of the circuit closers 62 and 65 respectively so that an upward movement of the yoke will raise the circuit closers from a closing position to be engaged and held in open position by the armatures of the magnets 31 and 32. When therefore in the printing and recording operation of the machine the swinging yoke 106 is thrust rearwards for an impression against the type bars 119 or 120 arranged upon the type carrier 8, the yoke 113 is forced upward a sufficient distance to reset the circuit closers 62 and 65 and open the recording circuit. It will be understood that the chosen selective circuit has previously been broken by release of the selecting pointer by the operator. The type bars 119 and 120 are arranged in pairs spaced an equal distance apart on the type carrier corresponding to their travel between two impulses of the test drum 60, and the number of pairs on the carrier B is identical with the number of operating pins 84 on the master gear 4. The inverted form of the type is not shown in the drawings but it will be understood, with reference to Figs. 7 and 19, that impression of the paper tape 124 with the first type bar 119 of each pair in rotation will print the cipher "0" and from the second type bar 120 will be printed the numeral "5" on all the pairs recording the twenty questions and that the twenty first or last pair will print the instructions as indicated in Fig. 20. The ciphers will record the incorrect answers and the numeral "5" the correct answers. Since there are twenty correct answers in each division of the test drum each such answer represents 5% of the total and the addition of all the recorded correct answers will give an average percentage of the intelligence, knowledge, and mental alertness of the operator.

Electric current for driving the machine is supplied to the motor 2 from main line wires 125 and 126 (Fig. 2) and electric currents are supplied to the magnets 31, 32 and 57 by the storage battery 52, having terminal wires 127 and 128.

The return of the cutter blade, 156 after having severed the paper tape and which must precede the starting of the driving motor 2 is shown controlled by the insertion of a coin 132 (see Figs. 3, 5, and 6) in an aperture 133 in the front end of the compartment B and to the right hand side thereof. A push rod 134, having a hand knob 135, is arranged to slide in bearings 136 and 137 beneath and slightly to one side of the aperture 133 and carries a push block 138 having a recess 139 for the reception of the coin 132. A light compression spring 140 tends to hold the push rod 134 in the forward position shown in the drawings. The coin after insertion rests on shelves 142 and 143, spaced apart and having a cut away aperture 144 through which a coin of smaller diameter than the designated coin will drop through a chute 145 into a receptacle 146 provided in the lower compartment of the machine. A slide 147 having a slot 148 and lugs 149 and 150 adapted to engage the coin 132 is arranged to slide upon the shelves 142 and 143 and is provided with downwardly projecting lugs 151 and 152 through which the push rod 134 slidingly passes. The lug 152 extends horizontally inwards and embraces a stationary horizontal rod 153, which is fastened to a lug 154 on the rear end of the machine. The rod 153 passes loosely through a lug 155 secured to the cutter blade 156 and a coiled compression spring 157 forces the lug 155 against the lug 152 of the slide 147. The tension of the spring 157 thus holds the cutter blade 156 in the forward position shown by the full lines in Figs. 3 and 4 and in dotted lines in Fig. 5.

To start the machine after insertion of a coin the rod 134 is pushed inwards engaging the coin 132 in the recess 139. By the further inward movement of the rod the coin, striking the lugs 150 of the slide 147 carriers the said slide along the rest of the movement and with it the cutter blade 156 until the lug 158 of the blade 156 is caught by the detent 159 as shown by dotted lines in Fig. 3. At the release of the push rod by the operator it returns to the original position impelled by the spring 140, while the slide 147 remains with the cutter blade in the rearward position. The coin then is discharged from the recess 139 and drops through an opening 149 into the receptacle 146. The last part of the rearward movement of the cutter blade to the position shown in dotted lines in Fig. 3, automatically starts the motor and makes switch connections with the battery 52 as in the application of record so that the magnets 31, 32, and 68 may be energized by the depression of the selecting pointer 36.

The operation of the machine generally and briefly recapitulated, is as follows:

With the insertion of a coin followed by the inward thrust of the hand knob 135 to its limits, the cutter blade 156 is carried to its farthest backward position, thereby starting the electric motor 2 and switching on the battery 52. The test drum 16, being advanced a step by the initial rotation of the master gear 4 brings question No. 1 to view through a front aperture 11' in the casing 11 and simultaneously contacts a pin 21 with one of the contact springs 23. Referring to Fig. 19 the machine now being set for the selection of an answer to the submitted question, if one of the contact terminals $a$, $c$, or $d$ not in contact with a pin 21, is selected as in line with the supposed correct answer and the pointer 36 is depressed the selecting circuit is closed through the magnet 31 as indicated in dotted lines. When the record selector 60 controlling the recording circuit reaches the first contact strip 70 on the dial plate connected to this magnet by the wire 67 the recording circuit is closed through the magnet 31 as above described. Exactly at this point in the travel of the type carrier 8 the type bar 119 provided with the cipher is in line with the impression member of the printing and recording mechanism and a cipher, indicating a wrong or incorrect answer is printed and recorded on the tape 124. If however the selecting pointer 36 is depressed on the terminal $b$ electrically connected to the spring 23—B in contact with the pin 21, the selecting circuit is closed through the magnet 32 as shown in full lines and the recording circuit will be closed through the wire 73 when the record selector 60, after passing a contact strip 70 contacts a strip 72. While the selector 60 passes from the first strip 70 to the second strip 72 the type carrier 8 has advanced from the first type bar 119 to the second type bar 120 provided with the numeral "5" and this numeral will be printed and recorded upon the recording tape 124 as indicating that the right or correct answer to the submitted question has been made. The recording paper tape 124 will be caused to emerge from a slot 160 in the manner disclosed in the aforesaid invention. As the master gear 4 slowly rotates the driving pins 84 successively raise and drop the actuating lever 85 thereby resetting the circuit closers 62 and 65, rotating the test drum 16 in a step by step movement and successively exposing to view the questions and answers arranged upon the said drum. The time limit for the answer to each question is predetermined by the speed of the motor and the speed ratio between the motor and the master gear 4. This ratio is predetermined and regulated by the ratio of the speed reducing train of gears 3, and when established is accurate as to the time limit allotted for the answer of each question. With the passing of the last question on the drum 16 the master gear 4 has made nearly a complete revolution and its last driving pin 84 again brings the heading section on the drum into view. At this point all the selective type bars 119 and 120 of the type carrier 8 have passed the printing point and the remaining pair of type bars are provided with types for printing the instructions on the recording tape. For this purpose a grounded contact plate 162 is arranged upon the dial plate 71 and as the record selector 60 contacts this plate during its last travel of the operation, the recording circuit is closed for the printing of the instructive head lines of the record, while the contact springs 23 of the test drum engage an insulated segment 163 on the said drum. With the completion of a revolution of the master gear 4 and record selector 60 the machine automatically is made to stop, the cutter blade is released for severing the record tape and the recording section of the machine restored to its original state by depression of the detent 159 by cam means not shown in the present application.

In Figs. 21 to 23 we have illustrated means for closing public access to the test drum 16 through the reading aperture 11' and for exposing to view only one of the test divisions at any one time. The selector slide 164 is here made longer and is provided with a sight aperture 165. Spaced from the slide 164 to provide room for the switch and contact springs, above described but not here shown, is arranged an endless soft metal tape 166 having a frontward projecting driving lug 167 engaging a slot in the selector slide 164. The tape 166 passes around the test drum 16 over idler rolls 168 mounted in brackets 169 secured to the side walls of the compartment. The said tape is at the front side provided with a sight aperture 170 registering with the aperture 165 and preferably at the rear of the drum 16 with a suitable tightening device 172. A lateral slot 173 is arranged in the inclined front member 174 of the compartment casing. A window plate 175 of glass or other transparent material covers the sight aperture 170 of the tape 166 and is fastened to the casing by a thin metallic retainer 176 having a sight perforation 177 corresponding to the lateral slot 173 in the casing member 174 and extending the full reading length of the test drum 16. A series of three test divisions shown in dotted lines in Fig. 22 is indicated on the test drum, and the selector slide may be moved to register the sight apertures 165 and 170 with the selected test divisions which will be visible through the opaque plate or window 175 while the rest of the test divisions will be covered from view by the imperforated part of the tape 166.

While we have illustrated our invention as far as now described in connection with the printing and recording machine shown in the application for Letters Patent heretofore referred to as being suitable for this purpose, we do not limit the claims of this invention to this construction as it is obvious that other inexpensive mechanism may be provided for printing a simple record of affirmative or negative answers to questions presented in successive order.

In Figs. 24 to 30 we have illustrated a novel simplified printing and recording device in combination with the above described psychological test apparatus.

Referring first to Figs. 24 and 25, the motor power transmission to the master gear 4 remains substantially unchanged but the gear 4 is carried on a shaft 181 and is shown mounted on the inside of the frame 182 of the machine. The driving pins 84 are dispensed with and a cam 183 fastened to the gear 180 operates to impart a step by step movement of the test drum 16. In place of the driving pins 20 the test drum 16 carries a ratchet wheel 184 having equidistantly spaced teeth corresponding in number to the number of questions plus the instruction space on the test drum. A bifurcated operating lever 185, carrying on one of its arms a spring pressed actuating pawl 186 engaging the teeth of the ratchet wheel 184, is swingingly mounted on the drum shaft 17. The other arm of the lever 185 is pivotally connected to a follower 187 having a longitudinal slot 188 slidingly fitting the shaft 181. The follower is provided with a lug or roller 189 normally bearing against the spiral circumferential face 190 of the cam 183. A helical spring 192 is attached to one of the arms of the lever 185 and is tensioned to force the roller 189 of the follower 187 against the cam 183. The outermost section of the spiral face 190 is radially cut away at 193 to the inner section of the spiral. As the cam 183 travels in the direction of the arrow "a" the roller 189 is disengaged from the cam face 190 and the follower 187 is permitted to slide inwards over the shaft 181 giving a swift swinging motion to the operating lever 185 and imparting a one step rotative movement to the ratchet wheel 184 and test drum 16.

A printing roller 195 having types 196 preferably of a form to print the submitted questions in alphabetical order as indicated in Figs. 28 and 31 is journalled in bearings in the frame 182 of the machine. A paper tape feeding roller 197 is mounted in moveable bearings 198 and is spring tensioned against the printing roller 195. A spring tensioned inking roller 199 is adapted to automatically supply ink to the printing roller 195. A ratchet wheel 200 is secured to one end of the printing roller 195 and is adapted to be operated by a spring pressed pawl 202 (see Fig. 29) arranged upon a pawl arm 203 pivotally mounted upon the roller shaft 204. The ratchet wheel 200 is spaced for the same number of teeth as is the ratchet wheel 184 of the test drum 16, but two of the teeth 205 and 206 are of a considerably greater length than the rest for a purpose which will hereinafter appear. A link 208 connects the pawl arm 203 with the operating lever 185 and the parts are so proportioned that the swinging movement of the lever 185 imparts a similar movement to the pawl arm 203 of a slightly greater arc of a circle than is included by either one of the long ratchet teeth 205 or 206. A curved stop plate 209 is arranged closely above the short ratchet teeth 207 which prevents the pawl 202 from engaging more than one of the short teeth at any one forward stroke. The long ratchet teeth 205 and 206 are preferably fastened to the inner side of the ratchet wheel 200 and project slightly above the stop plate 209. The pawl 202 is of sufficient width to also catch the longer teeth and thus the printing roller will be rotated by a number of short steps corresponding to the number of short teeth 207 and by long steps corresponding to the long teeth 205 and 206 in the ratchet wheel 200. The total number of teeth in the ratchet wheel 200 must correspond with the total number of teeth in the ratchet wheel 184 of the test drum 16 but obviously this total may be varied and the relative numbers of long and short teeth in the ratchet wheel 200 may also be varied to suit different situations.

The recording paper tape 124 passes upwards from the tape roll 212 between the rollers 195 and 197 and as the rollers rotate the letters representing each question alphabetically on the test drum 16 are printed on the recording tape in corresponding alphabetical order. The stereotyped lettered questions are spaced to be printed equidistant on the tape by the passing of the short ratchet teeth, while the heading and instructions are allowed greater space by means of the passing of the long ratchet teeth under the pawl 202. Retaining springs 214 and 215 on the ratchet wheels 184 and 200 respectively keep the two wheels in synchronized relation.

The selected answers to the questions are printed on the recording tape 124 by the selective operation of two printing bars 216 and 217 arranged to slide longitudinally at the upper right hand side of the machine between pairs of rollers 218 and 219 mounted in guide brackets 220 and 221 respectively. Light coil springs 222 hold the bars in a rearward position against stops 223 (Fig. 26). The printing bar 216 has on its forward end a "0" formed type and the bar 217 a "5" formed type. An inking roller 224 is swingingly mounted upon the guide bracket 221 in the conventional manner common in printing presses so that when the type bars are thrust forward to print, ink is supplied to the type while the inking roller is automatically moved out of the way by the type bars.

A transversely arranged platen 226 is secured to upstanding rocker arms 227 pivoted to the frame 182 at each side of the machine and yieldingly held against stops 229 by a spring 230. A transverse guide plate 232 is also attached to the arms 227 and the paper tape 210 is fed upwards from the printing rollers 195 and 197 and between the guide plate 232 and platen 226 to the printing bars 216 and 217. These bars are shown arranged side by side and the bar 216, which carries the type numeral "5" on its forward end, is provided at its rear end with an upwardly and laterally bent lug 234 overlapping the rear end of the bar 217, as best shown in Figs. 26 and 27.

A selecting driving bar 235 for the printing bars is slidingly arranged between guide brackets 220 and 237 and carries on its rear end a driving lug 238 projecting in the rear of the printing bars and adapted to be raised or lowered to come in driving level with either one of the printing bars 216 or 217. The driving bar 235 is pivotally connected to the pawl arm 203 and link 208 at 236 and normally rests on a roller 218 with its driving lug 238 on a horizontal plane with the printing bar 217 carrying the type "0" on its forward end as shown in Figs. 24 and 27.

The selecting magnets 31 and 32 are arranged in a bracket 239 below the driving bar 235 and the armature 240 of the magnet 32, which electrically controls the right answers, is in the form of a bell crank the crank arm 241 of which is positioned under the selecting driving-bar 235 so that when the electrical circuit is closed through this magnet the crank arm of the armature 240 raises the driving lug 238 of the bar 235 from the horizontal driving plane of the "0" printing bar 217 to the driving plane "5" of the printing bar 216. The armature 242 of the magnet 31 is arranged immediately forward of the crank arm 241 of the armature 240 and is provided with a latch 243 which impelled by a spring drops under the crank arm 241 and holds the driving bar 235 in position to propel the printing bar 216 when the operating lever 185 is released by rotation of the cam 183 as shown in Fig. 25. The armature 242 projects upwards at 244 in the path of the driven lug 234 of the printing bar 216 and when this bar is thrust forward to printing position the crank arm of the armature 240 is released and returns to the original position of an open circuit as illustrated in Fig. 30.

It is desirable that the printing by the bars 216 and 217 be omitted at the top and bottom of the test recording tape and also that the test results be printed in a straight vertical order on the record, as indicated in Fig. 20. For this purpose, as will be seen by reference to Fig. 31, the printing roller 195 is provided with a cam 245 in position to engage one of the rocker arms 227 and move the paper tape out of reach of the printing bars 216 and 217 at the time the upper and lower sections of a record pass the printing point. Stop lugs 247 arrested against the guide brackets 221 prevent the printing bars from reaching the paper until the passing of the cam 245 permits the platen 226 to assume its normal position impelled by the spring 230, which is timed to occur after the printing bars have returned from printing position.

In Figs. 26 and 32 is illustrated one form for printing the two kinds of answers in a straight vertical order on the recording tape by the two parallel printing bars. The bars are shown slightly separated and the printing ends 249 are brought together by an offset. Cam strips 250 of a thickness corresponding to the offsets and terminating in stop lugs 251 are formed in the outer side of the bars. As either one of the bars moves toward the platen 226 the forward incline of the cam strip 250 engaging the guide bracket 220 throws the printing type of the bar to a common central position of both bars, the offsets 249 permitting this movement as the bar is moved forward.

The manual operation of the modified form of machine is identical with that heretofore described with reference to Figs. 1 to 19 of the drawings. The coin controlled mechanism for starting the machine, omitted in the drawings of this modification, will be understood to be equally applicable to this form of machine.

With the starting of the machine by the return movement of the tape cutter 156 by means of the coin controlled push rod 134 and its connections the follower 187 almost at once assumes the position shown in dotted lines in Fig. 24. Referring to Figs. 29 and 33 it will be understood that these figures represent the position of the printing rollers with their ratchet driving mechanism and the recording tape in the position assumed before the last advance of the printing rollers and tape after the test indicator has been moved to indicate the display heading by the start of the cam 183. The following and last revolution of the cam in the cycle of operation operates the ratchet wheel 200, and tape 124 a long step and brings question A on the tape to the printing position of the bars 216 and 217 and the cutting line of the tape above the heading in line with the tape cutter 156, as indicated in Fig. 33. With the cutting of the tape the machine stops with the first question A in line with the printing bars 216 and 217 and the display heading on the test drum 16 exposed. After again starting, the immediate first effect is the advance of the test drum or indicator to present the first question A. As the cam 183 slowly rotates the operator selects an answer and closes the corresponding electrical circuit as above described. Referring to Fig. 30, if terminal "c" is chosen the circuit is closed through the magnet 32, the crank arm 241 of the armature 240 of this magnet raises the selector bar 235 to line up the driving lug 238 with the lug 234 of the printing bar 216 and latching the selector bar in the raised position by the armature 243 of the magnet 31 as indicated in Fig. 25. If a, b, or d is selected the circuit is closed through the magnet 31 and the driving lug 238 remains in line with the printing bar 217 as indicated in Fig. 30. Any answer first selected by the person tested may be changed before the cam 183 reaches the drop off printing point. If a change is made from the right to the wrong answer by breaking the circuit through the magnet 32 and closing it through the magnet 31, the armature 240 is unlatched by the armature 242 and the selector bar 235 drops back in line with the printing bar 217 carrying the printing type "0". The selected answer "5" or "0" is printed upon the tape 210 and another question is presented when the cam 183 passes the printing point. This operation is repeated until the test drum has presented twenty questions, the recording tape has advanced the same number of steps and the printing rollers 195 and 197 have printed the same number of alphabetically represented questions as indicated in Fig. 31. The two last and longer steps of the printing rollers advances the recorded tape an additional distance for the purpose above set forth. It will be understood that the vertical distance between the printing rollers 195 and 197 and the printing bars 216 and 217 is proportioned, and the alphabetical order of the questions on the test drum 16 and printing roller 195 synchronized, so that the printed questions and answers always correspond with the presented questions on the test drum.

Obviously many changes of details and modifications of construction from that shown may be made within the scope and principle of this invention, and having now disclosed it fully and clearly, what we claim as our invention is:—

1. A psychological test machine comprising moving test indicator successively presenting legible test problems and proposed solutions thereof and means for operatively selecting one of the said solutions and recording the selected solution in a measured length of time.

2. A psychological test machine comprising a test indicator having a series of problems and proposed solutions thereof indicated on its face, means cooperating with said test indicator for legibly and successively presenting the said problems and solutions and means for operatively selecting and recording the selected solution in a predetermined length of time.

3. A psychological test machine comprising a traveling test indicator having a series of questions and a plurality of answers to each question made legible by the travel of said member, one of said answers to each question being correct and the others incorrect and means for operatively selecting and recording the selected answer in a predetermined length of time.

4. In a machine of the class described, a traveling test indicator having a plurality of test divisions of successively presented legible test questions and proposed answers thereto, means for selecting one of said test divisions and means for operatively selecting a proposed answer in said division and recording the selected answer in a predetermined length of time.

5. In a machine of the class described a psychological test device comprising an intermittently moving test indicator having legible test questions and proposed answers thereto successively exposed during predetermined intervals of its movement and means for operatively selecting a proposed answer and recording it only during the predetermined intervals.

6. In a machine of the class described, a psychological test device comprising an intermittently moving test indicator having legible test questions with proposed answers thereto arranged in divisions on said indicator and successively exposed during predetermined intervals of its movement, means for operatively selecting a division of test questions and means for selecting and recording a proposed answer to a question on the selected division.

7. In a machine of the class described a psychological test device comprising an intermittently moving test indicator having predetermined intervals of rest, means for legibly presenting during each of said intervals, a problematical test question and a plurality of suggested answers thereto one only of which is correct and means for operatively selecting and recording a selected answer during the rest interval of the test indicator.

8. In a machine of the class described, a moving test indicator having predetermined intervals of rest, means for automatically presenting, during each of said intervals, a test question and a plurality of suggested answers thereto, means for operatively selecting one of the suggested answers as correct, an electrically controlled recording device operating at the end of each rest period of the test indicator and means cooperating with the said device whereby a selected answer registered can be changed and another answer recorded before the next question is presented.

9. In a machine of the class described a testing device comprising an intermittently advancing test indicator having measured periods of rest, means for presenting legibly a different test question and a plurality of suggested answers thereto for each of said periods of rest, means for operatively selecting a suggested answer to the presented question, a recording device comprising selective recording members and means cooperating with the selecting means for operating a corresponding recording member when the test indicator is advanced.

10. In a machine of the class described a testing device comprising a rotatable test indicator upon which a series of questions with correct and incorrect answers thereto are indicated, an electrical circuit including a magnet, a manual circuit closer and pointer adjustable to point to either one of the indicated answers, a contact terminal for each of said answers, electrical connections between the contact point for the correct answer and the said magnet and means controlled by the magnet for recording the answer correct when the electrical circuit is closed with the circuit closer pointing to the correct answer.

11. In a machine of the class described a testing device comprising a rotatable test indicator upon which questions with correct and incorrect answers thereto are indicated, an electrical circuit, including an insulated contact section arranged on the test indicator, circuit closing members spaced radially upon the said section, a manual circuit closer and pointer adjustable to point to one of the indicated answers, electrical connections between the contact terminal for the correct answer and a corresponding circuit closing member upon the said contact section, a magnet included in the electrical circuit and means controlled by the magnet for recording the answer correct when the circuit is closed with the circuit closer pointing to the correct answer.

12. In a machine of the class described a testing device comprising a rotatable test indicator upon which questions with correct and incorrect answers thereto are indicated, an electric circuit incuding an insulated contact section upon the test indicator, a manual circuit closer and pointer adjustable to point to one of the indicated answers, a contact terminal corresponding in position to each answer on the test indicator, a second magnet, electrical connections between the contact terminals for the incorrect answers and the second magnet and means controlled by the second magnet for recording the answer incorrect when the electrical circuit is closed by the circuit closer pointing to the incorrect answer.

13. In a machine of the class described a testing device comprising a rotatable test indicator upon which questions with correct and incorrect answers thereto are indicated, an electrical circuit including two magnets, having armatures, means for closing said circuit and energizing one of said magnets when the correct answer to a question is indicated, means cooperating with the armature of the second magnet to hold the armature of the first named magnet in closed position and means for releasing the said armature when an incorrect answer is indicated.

14. In a machine of the class described, a rotatable indicator upon which a series of questions with correct and incorrect answers are indicated, an electrical circuit and a manually operative circuit closer, a printing device for recording the character of an answer when the said circuit is closed and means for normally recording an incorrect answer except when a correct answer is indicated.

15. In a psychological testing device the combination with a casing of a test indicating member and controller movably mounted and concealed in said casing, a plurality of test divisions arranged upon the face of said indicating member, each division provided with a series of questions and answers thereto, an aperture arranged in said casing through which questions and answers thereto may be read in all of said divisions, a division selecting member normally covering said aperture and movable means connected to said selecting member for exposing the questions and answers on a selected division and concealing the other divisions.

16. In a psychological testing device the combination with a moving test indicating member and controller having a plurality of test divisions arranged upon its face, each of said divisions being provided with a series of questions and answers, means for concealing all of said questions except one for each division, a division selecting slide, a tape connected to said slide and means including a transparent member and an aperture in said tape for exposing the questions and answers successively in one division and concealing all the rest.

17. In a machine of the class described the combination of a test indicator and controller having a plurality of test divisions, a plurality of permanent electrical terminals arranged for each test division, a movable division selector having a corresponding plurality of electrical contact members and terminals, an electrical circuit connected to all the permanent electrical terminals, a test recording device selectively controlled through the electrical circuit and means cooperating with said division selector for closing the electrical circuit and controlling the test recording device through a permanent terminal of any selected test division.

18. In a machine of the class described the combination of a rotatable test indicator and controller having a plurality of test divisions of questions and answers, a plurality of permanent electrical terminals arranged for each test division, a movable division selector having a corresponding plurality of electrical contact members and terminals, an electrical circuit connected to all of said permanent electrical terminals, a circuit closer interposed in said circuit and arranged upon the division selector, a test recording device selectively controlled through the electrical circuit and means cooperating with the said circuit closer and said division selector for controlling the test recording device through the permanent electrical terminals of each test division.

19. In a machine of the class described a recording device comprising a motor driven impression roller and a blank feeding roller cooperating to impress designating characters upon the said blank, a plurality of impression members, a platen over which the said blank is caused to pass by the said feeding roller, a selecting device for said impression members, a motor driven cam and means cooperating with said cam to periodically impel a selected impression member against said platen and impress a character upon said blank.

20. In a machine of the class described, a recording mechanism comprising an impression roller, a blank tape feeding roller cooperating with said impression roller to impress designating characters upon the said tape, a plurality of impression members, a platen over which the tape is caused to pass, a selecting device for said impression members, a motor driven cam, means cooperating with said cam to periodically impel a selected impression member to print a qualifying character on said tape and means for correlating the selected qualifying characters on the tape to the designating characters printed by the impression roller.

21. In a machine of the class described the combination with a recording device of motor driven impression and blank tape feeding rollers cooperating to print head lines and characters upon the said tape, a plurality of impression members and a platen cooperating to print descriptive qualifying marks for said characters upon the blank tape and means for automatically adjusting said platen for omitting the printing of said marks on the head line spaces of the tape.

22. In a machine of the class described the combination with a recording device, and motor driven impression and paper tape feeding rollers cooperating to print characters upon said tape, of a plurality of printing bars arranged in parallel, selecting and operating devices by which a printing bar is selected and caused to be periodically impelled, a platen over which the paper tape passes and means for automatically aligning the impression point of the printing bars to successively impress marks on the paper tape in a straight line order as the printing bars are impelled against the platen.

23. In a machine of the class described the combination in a recording device of an impression roller and a platen roller, a ratchet wheel having short and long spaced teeth, means cooperating with said rollers and said ratchet wheel for making correspondingly short and long spaced impressions upon a paper blank, and independent impression means for selectively characterizing the short spaced impressions upon said blank.

24. In a machine of the class described the combination in a recording device of a printing roller having short and long spaced printing types upon its circumferential face, an inking device for said types, a pawl and ratchet device and means cooperating with said device for rotating the printing rollers in alternating short and long space steps.

25. In a machine of the class described a selective recording device comprising an electric circuit, a plurality of selective magnets interposed in said circuit, manually operated selective means for energizing one of said magnets, a blank tape and means for making printed impressions upon said tape, a plurality of independent impression members, motor driven actuating means for said impression members and means controlled by the selective magnets for shifting said driving means to a selected one of said impression members, an inking device for the impression and means for printing a record upon the said tape by the selected impression member.

26. In a machine of the class described, a reading and selecting device comprising a casing having a reading aperture, a rotatable test indicator having a series of questions and answers arranged upon its face and positioned to be read through said aperture, a series of electrical contact points arranged upon said indicator, each contact point corresponding to a question, a toothed driving member each tooth of which also corresponds to a question, a motor, a master gear and driving connections between said motor and said gear, a cam cooperating with said gear for rotating the test indicator in a step by step movement, an electrical circuit including two magnets and a plurality of contact members arranged upon the test indicator, selecting circuit closers and breakers interposed in the electrical circuit, and a manual contact closer for selecting and indicating an answer readable on the test indicator.

27. In a machine of the class described an intermittently moving test indicator presenting a question and indicating a correct and incorrect answer therefor, an electric circuit including variously spaced contact points on the test indicator for each of said answers, a contact terminal for each of said circuits, a circuit closer manually operative to contact a selected one of said terminals and indicate the selected answer and means including a blank tape and impression members for recording the selected answer.

28. In a machine of the class described an intermittently moving test indicator, a plurality of test divisions arranged upon the face of said indicator, each of said divisions being provided with a series of questions and answers thereto, means for concealing all of said questions and answers, except one question and answers thereto at a time, a division selecting slide, a moveable opaque cover connected to said slide and means including a transparent pane and an aperture in the opaque cover for exposing the questions and answers in any selected division and concealing the remainder divisions.

29. In a machine of the class described a motor driven intermittently moving test indicator, having means for presenting a cycle of questions with correct and incorrect answers thereto, means for selecting and recording an answer to each question during successive periods of rest of the indicator during the cycle, a locking device holding the indicator against movement when a cycle of operation is completed, a starting device and means cooperating with said device whereby the indicator can be operated only after the insertion of a coin in said device.

HENRY C. LAVERY.
FRANK P. WHITE.